US012262162B2

(12) United States Patent
Pinkerton et al.

(10) Patent No.: US 12,262,162 B2
(45) Date of Patent: Mar. 25, 2025

(54) ELECTROACOUSTIC DRIVERS AND LOUDSPEAKERS CONTAINING SAME

(71) Applicant: Clean Energy Labs, LLC, Austin, TX (US)

(72) Inventors: Joseph F. Pinkerton, Austin, TX (US); William Neil Everett, Cedar Park, TX (US)

(73) Assignee: Brane Audio, LLC, Austin, TX (US)

( * ) Notice: Subject to any disclaimer, the term of this patent is extended or adjusted under 35 U.S.C. 154(b) by 185 days.

(21) Appl. No.: 17/775,497

(22) PCT Filed: Nov. 9, 2020

(86) PCT No.: PCT/US2020/059634

§ 371 (c)(1),
(2) Date: May 9, 2022

(87) PCT Pub. No.: WO2021/092540

PCT Pub. Date: May 14, 2021

(65) Prior Publication Data

US 2022/0394365 A1 Dec. 8, 2022

Related U.S. Application Data

(60) Provisional application No. 62/962,770, filed on Jan. 17, 2020, provisional application No. 62/932,971, filed on Nov. 8, 2019.

(51) Int. Cl.
*H04R 1/02* (2006.01)
*H04R 1/24* (2006.01)
(Continued)

(52) U.S. Cl.
CPC ............... *H04R 1/025* (2013.01); *H04R 1/24* (2013.01); *H04R 1/2803* (2013.01); *H04R 11/02* (2013.01)

(58) Field of Classification Search
CPC ........ H04R 1/025; H04R 1/24; H04R 1/2803; H04R 11/02
See application file for complete search history.

(56) References Cited

U.S. PATENT DOCUMENTS 5,809,157 A 9/1998 Grumazescu
2016/0345083 A1* 11/2016 Pinkerton ............ H04R 1/2896
2018/0048963 A1 2/2018 Pan

FOREIGN PATENT DOCUMENTS

EP 0114910 A1 1/1983
EP 0188341 A2 1/1986
(Continued)

OTHER PUBLICATIONS

Gabrielle Yu ( University of Californai, Fall 2015), Magnetostriction https://eng.libretexts.org/Bookshelves/Materials_Science/Supplemental_Modules_(Materials_Science)/Magnetic_Properties/Magnetostriction (Year: 2015).*
(Continued)

*Primary Examiner* — Sunita Joshi
(74) *Attorney, Agent, or Firm* — Dickinson Wright PLLC; Ross Spencer Garsson

(57) ABSTRACT

Electroacoustic drivers that can be utilized in loudspeaker systems that utilize bidirectional force electromagnet transducers or piezoelectric transducers. The electroacoustic drivers can include motion amplifiers such as lever arms. The electroacoustic drivers can be used at all audio frequencies including frequencies below 500 Hz.

29 Claims, 17 Drawing Sheets

(51) Int. Cl.

| | |
|---|---|
| ***H04R 1/28*** | (2006.01) |
| ***H04R 11/02*** | (2006.01) |

(56) References Cited

FOREIGN PATENT DOCUMENTS

| | | | | |
|---|---|---|---|---|
| JP | 0373699 | A | | 3/1991 |
| JP | H0373699 | A | * | 3/1991 |
| JP | 2000225377 | A1 | | 8/2000 |
| WO | 2021092540 | A1 | | 5/2021 |

OTHER PUBLICATIONS

Patent Cooperation Treaty, International Preliminary Report on Patentability for PCT/US2020/059634 dated May 10, 2022; 8 pages.

Officer Deborah Grandis; International Search Report and Written Opinion; PCT/US2020/059634; Date of Mailing Feb. 9, 2021; 15 pages.

* cited by examiner (Reproduced from PCT Patent Appl. No. PCT/US19/30438)

(Reproduced from PCT Patent Appl. No. PCT/US19/30438)

(Reproduced from PCT Patent Appl. No. PCT/US19/30438)

(Reproduced from PCT Patent Appl. No. PCT/US19/30438)

(Reproduced from PCT Patent Appl. No. PCT/US19/30438)

(Reproduced from PCT Patent Appl. No. PCT/US19/30438)

(Reproduced from PCT Patent Appl. No. PCT/US19/30438)

(Reproduced from PCT Patent Appl. No. PCT/US19/30438)

ELECTROACOUSTIC DRIVERS AND LOUDSPEAKERS CONTAINING SAME

RELATED PATENTS/PATENT APPLICATIONS

This application is a 35 U.S.C § 371 national application of PCT Application No. PCT/US2020/059634, filed on Nov. 9, 2020, entitled "Electroacoustic Drivers And Loudspeakers Containing Same", which claims priority to (a) U.S. Provisional Patent Application Ser. No. 62/932,971, filed Nov. 8, 2019 to Joseph F. Pinkerton et al., entitled "Improved Electroacoustic Drivers and Loudspeakers Containing Same," and (b) U.S. Provisional Patent Application Ser. No. 62/962,770, filed Jan. 17, 2020 to Joseph F. Pinkerton et al., entitled "Improved Electroacoustic Drivers and Loudspeakers Containing Same."

This application is also related to International Patent Application No. PCT/US19/30438, filed May 2, 2019, to Joseph F. Pinkerton et al., entitled "Loudspeaker System And Method Of Use Thereof," (the "Pinkerton PCT '438 Patent Application"), which claims priority to (a) U.S. Provisional Patent Application Ser. No. 62/666,002, filed on May 2, 2018, to Joseph F. Pinkerton et al., and entitled "Audio Speakers," and (b) U.S. Provisional Patent Application Ser. No. 62/805,210, filed on Feb. 13, 2019, to Joseph F. Pinkerton et al., and entitled "Loudspeaker System And Method Of Use Thereof."

This application is also related to U.S. Pat. No. 9,826,313, issued Nov. 21, 2017, to Joseph F. Pinkerton et al., and entitled "Compact Electroacoustic Transducer And Loudspeaker System And Method Of Use Thereof," ("the Pinkerton '313 Patent,") which issued from U.S. patent application Ser. No. 14/717,715, filed May 20, 2015.

This application is also related to International Patent Application No. PCT/US19/057871, filed Oct. 24, 2019, to David A Badger et al., entitled "Stereophonic Loudspeaker System And Method Of Use Thereof," (the "Badger PCT '871 Patent Application"), which claims priority to U.S. Provisional Patent Application Ser. No. 62/749,938, filed on Oct. 24, 2018, 2018, to David A. Badger et al., and entitled "Stereophonic Loudspeaker System And Method Of Use Thereof."

All of the above-identified patent applications are commonly assigned to the Assignee of the present invention and are hereby incorporated herein by reference in their entirety for all purposes.

TECHNICAL FIELD

The present invention relates to electroacoustic drivers and loudspeakers that have and use same.

BACKGROUND

Audio speakers generally include an enclosure and at least one sound transducer, or active driver speaker, having a driver surface or diaphragm that produces sound waves by converting an electrical signal into mechanical motion of the driver diaphragm. An audible sound, or "sound wave," is produced by periodic pressure changes propagated through a medium, such as air. Sound transducers, such as active driver speakers, typically generate sound waves by physically moving air at various frequencies. That is, an active driver speaker pushes and pulls a diaphragm in order to create periodic increases and decreases in air pressure, thus creating sound.

High-frequency sounds have small wavelengths, and thus require only small, fast air pressure changes to be produced for a given perceived loudness.

On the other hand, low-frequency sounds have large wavelengths, and accordingly require large, slow air pressure changes for the same perceived loudness. The size of the pressure change is dependent on the amount of air the sound transducer or active driver speaker can move at a desired frequency.

In general, a small, lightweight diaphragm is efficient at producing high frequencies because it is small and comparatively lightweight, but may be inefficient at moving sufficient air to produce low frequencies. In contrast, a large diaphragm may be well suited for moving a large amount of air at low frequencies, but not fast enough to produce high frequencies efficiently. Thus, where space is available, many systems employ more two or more active driver speakers of different sizes in order to better achieve a flat frequency response across a wide frequency range.

For example, the Pinkerton PCT '438 Patent Application relates to a loudspeaker system that produces an audio quality for stereophonic sound utilizing electrostatic card stacks (covering 300 Hz to 20 kHz, which is around 98% of the audio frequency spectrum) and conventional electro-dynamic drivers (along with optional passive radiators) inside a sealed chamber (covering 20 Hz to approximately 300 Hz, which is the remaining part of the audio frequency spectrum). Both the stacks and cones can operate in the 200-500 Hz range or other cross-over ranges (and controlled as discussed in Badger PCT '871 Patent Application).

FIG. 1 (which is FIG. 7 in the Pinkerton PCT '438 Patent Application) is a photograph of loudspeaker 700 showing the arrangement of the four card stacks 701*a*-701*d* (of electrostatic membrane pumps) in arranged angles. As shown in FIG. 1, the arrangement of the four card stacks 701*a*-701*d* is around 90 degrees. The arranged angles can be generally at least around 30 degrees, and more generally around 45 degrees to around 120 degrees, and even more generally around 60 degrees to around 90 degrees. Loudspeaker 700 has a sealed chamber 703 that houses conventional electro-dynamic drivers 702*a*-702*b* and (optionally) passive radiators. Controller 704 is also electrically connected to the speakers to operate the card stacks 701*a*-701*d* and electro-dynamic drivers 702*a*-702*b* to produce the sound at the desired audio frequencies.

FIGS. 2A-2E (which are, respectively, FIGS. 8A-8E in the Pinkerton PCT '438 Patent Application) are illustrations of loudspeaker 800, showing a perspective, exploded perspective, frontal, right side, and top view, respectively. Certain interior elements of loudspeaker 800 are depicted in FIGS. 3A-3C (which are, respectively, FIGS. 9A-9C in the Pinkerton PCT '438 Patent Application). Loudspeaker 800 has a top 803 (with control buttons 806), a bottom 804, and a perforated sheet 801 (such as made of aluminum) surrounding the body of loudspeaker, including about the card stacks 901*a*-901*d* and electro-dynamic drivers 902*a*-902*d*. As shown in FIGS. 3A-3C, the arrangement of the four card stacks 901*a*-901*d* is around 60 degrees. As shown in FIGS. 2A-2E, the top 801 is curved, which the bottom 804 is flat (and optionally can have feet for better support). The perforated sheet has a weld seam or clip 802. Loudspeaker 800 also has conventional electro-dynamic drivers 902*a*-902*d* and (optionally) passive radiators. Loudspeaker 800 also an I/O 805 through which a device can be connected for exchanging data to be used to generate the audio signals of the device. Alternatively, a device, such as a mobile device, can be wirelessly coupled to loudspeaker 800, such as through Bluetooth standard.

The conventional electro-acoustic drivers used in the above-described system, as well as in other loudspeaker systems can benefit by being smaller, lighter, more efficient, and producing better audio sound. Accordingly, there remains a need to improve electroacoustic drivers for use in loudspeakers.

SUMMARY OF THE INVENTION

In general, in one aspect, the invention features and electroacoustic loudspeaker. The electroacoustic loudspeaker includes an electroacoustic driver including a bidirectional force electromagnet transducer or piezoelectric transducer. The electroacoustic loudspeaker further includes a sealed chamber having a first movable panel. The first movable panel is bounded by a first expandable boundary material so that the first movable panel can move inward and outward relative to the sealed chamber. The electroacoustic driver is operatively connected to the first movable panel for moving the first movable panel inward and outward relative to the sealed chamber. The movement of the first movable panel by the electroacoustic driver is operable for generating sound by the electroacoustic loudspeaker.

Implementations of the invention can include one or more of the following features:

The sealed chamber can have a second movable panel. The first movable panel and the second movable panel can be on opposing sides of the sealed chamber. The second movable panel can be bounded by a second expandable boundary material so that the second movable panel can move inward and outward relative to the sealed chamber. The electroacoustic driver can be operatively connected to first movable panel and the second movable panel for moving the first movable panel and the second movable panel. The electroacoustic driver can be operable for simultaneously moving the first movable panel and the second movable panel inward relative to the sealed chamber. The electroacoustic driver can be operable for simultaneously moving the first movable panel and the second movable panel outward relative to the sealed chamber. The movement of the second movable panel by the electroacoustic driver can be operable for generating sound by the electroacoustic loudspeaker.

The electroacoustic driver can be operable for generating sound below 1000 Hz by the electroacoustic loudspeaker.

The electroacoustic driver can be operable for generating sound below 500 Hz by the electroacoustic loudspeaker.

The electroacoustic driver can be operable for generating sound below 300 Hz by the electroacoustic loudspeaker.

The electroacoustic driver can include the bidirectional force electromagnet transducer.

The bidirectional force electromagnet transducer can be a direct drive bidirectional force electromagnet transducer.

The bidirectional force electromagnet transducer can have a maximum distance of range of movement of 0.5 mm to 2 mm.

The bidirectional force electromagnet transducer can have a maximum distance of range of movement of 0.5 mm to 1 mm.

The bidirectional force electromagnet transducer can include a ferromagnetic disc and one or more electromagnets.

The electroacoustic loudspeaker can further include a position sensor to track the position of the ferromagnetic disc.

The electroacoustic drive can include the piezoelectric actuator.

The piezoelectric actuator can have a small excursion of between 10 microns and 50 microns.

The electroacoustic loudspeaker can further include one or more motion amplifying arms that enable the piezoelectric transducer to move the first movable panel.

The electroacoustic drive can include the piezoelectric actuator. The electroacoustic loudspeaker can include further include one or more motion amplifying arms that enable the piezoelectric transducer to move the first movable panel and the second movable panel.

The electroacoustic loudspeaker can further include a motion amplifier.

The electroacoustic loudspeaker of claim 15, wherein the motion amplifier comprises one or more lever arms operatively connecting the electroacoustic driver and the first movable panel and the second moveable panel.

The motion amplifier can be capable of amplifying distance of movement of the first movable panel and distance of motion of the second movable panel to two to five times greater than distance of movement of the bidirectional force electromagnet transducer or piezoelectric transducer of the electroacoustic driver.

The electroacoustic loudspeaker further include a position sensor to track the position of the first movable panel, the second movable panel, or both.

The electroacoustic loudspeaker can further include an active feedback for controlling the movement of the first movable panel and the second movable panel.

The electroacoustic loudspeaker can be a levered electroacoustic driver including the piezoelectric actuator.

In general, in another aspect, the invention features a method that includes selecting an electroacoustic loudspeaker including an electroacoustic driver. The electroacoustic driver includes a bidirectional force electromagnet transducer or piezoelectric transducer. The method further includes utilizing the bidirectional force electromagnet transducer or piezoelectric transducer to move a first movable panel of the electroacoustic loudspeaker to generate sound.

Implementations of the invention can include one or more of the following features:

The method can further include utilizing the bidirectional force electromagnet transducer or piezoelectric transducer to move a second movable panel of the electroacoustic loudspeaker to generate sound. The electroacoustic driver can simultaneously move the first movable panel and the second movable panel inward relative to the sealed chamber. The electroacoustic driver can simultaneously move the first movable panel and the second movable panel outward relative to the sealed chamber.

The sound generated can be below 1000 Hz.

The sound generated can be below 500 Hz.

The sound generated can be below 300 Hz.

The electroacoustic driver can include the bidirectional force electromagnet transducer.

The bidirectional force electromagnet transducer can be a direct drive bidirectional force electromagnet transducer.

The bidirectional force electromagnet transducer can have a maximum distance of range of movement of 0.5 mm to 2 mm.

The bidirectional force electromagnet transducer can have a maximum distance of range of movement of 0.5 mm to 1 mm.

The bidirectional force electromagnet transducer can include a ferromagnetic disc and one or more electromagnets.

The method can further include utilizing a position sensor to track the position of the ferromagnetic disc.

The electroacoustic drive can include the piezoelectric actuator.

The piezoelectric actuator can have a small excursion of between 10 microns and 50 microns.

The electroacoustic loudspeaker can further include one or more motion amplifying arms that enable the piezoelectric transducer to move the first movable panel. The method can further include utilizing the one or more motion amplifying arms to amplify the movement of the first movable panel relative to movement of the piezoelectric transducer.

The electroacoustic drive can include the piezoelectric actuator. The electroacoustic loudspeaker can further include one or more motion amplifying arms that enable the piezoelectric transducer to move the first movable panel and the second movable panel. The method can further include utilizing the one or more motion amplifying arms to amplify the movement of the first movable panel and the second movable panel relative to movement of the piezoelectric transducer.

The electroacoustic drive can further include a motion amplifier. The method can further include utilizing the motion amplifier to amplify the movement of the first movable panel relative to movement of the bidirectional force electromagnet transducer or piezoelectric transducer.

The electroacoustic drive further can include a motion amplifier. The method can further include utilizing the motion amplifier to amplify the movement of the first movable panel and the second movable panel relative to movement of the bidirectional force electromagnet transducer or piezoelectric transducer.

The motion amplifier can include one or more lever arms operatively connecting the electroacoustic driver and the first movable panel and the second moveable panel. The method can further include utilizing the lever arms to amplify the movement of the first movable panel and the second movable panel relative to movement of the bidirectional force electromagnet transducer or piezoelectric transducer.

The method can further include utilizing the motion amplifier to amplify distance of movement of the first movable panel and distance of motion of the second movable panel to two to five times greater than distance of movement of the bidirectional force electromagnet transducer or piezoelectric transducer of the electroacoustic driver.

The method can further include utilizing a position sensor to track the position of the first movable panel, the second movable panel, or both.

The method of can include utilizing an active feedback to control the movement of the first movable panel and the second movable panel.

The electroacoustic loudspeaker can be a levered electroacoustic driver included the piezoelectric actuator.

The method can further include utilizing the bidirectional force electromagnet transducer or piezoelectric transducer to move a second movable panel of the electroacoustic loudspeaker to generate sound.

The method can include that the selected electroacoustic loudspeaker is one or more of the above-described electroacoustic loudspeaker.

DETAILED DESCRIPTION

The present invention is directed to improved electroacoustic drivers that can be utilized in loudspeaker systems that utilize bidirectional force electromagnet transducers or piezoelectric transducers. The present invention is applicable to electroacoustic drivers for use at all audible frequencies. However, the electroacoustic drivers of the present invention are particularly advantageous for in the lower frequency ranges, such as below 1000 Hz, and more particularly below 500 Hz, and even more particularly below 300 Hz.

Transducers with Motion Amplification

The present invention utilizes a mechanism inside that is capable of controllably moving diaphragms of large relative surface area utilizing electromagnets and/or piezoelectric actuators. While electromagnets and/or piezoelectric actuators are not typically used for electroacoustic drivers mechanisms (since the amount of movement is relatively small) in comparison to the what is generally required, it has been discovered that these can be utilized to provide for significantly smaller, lighter, more efficient, and better sounding electroacoustic speakers. It has been found that the electroacoustic drivers of the present invention can produce at least four times the sound pressure as compared to conventional electro-dynamic drivers of the same size and weight. Moreover, the sound pressure is much higher at the lowest end of the audible frequency range (20 Hz to 60 Hz), which is generally the most difficult range for loudspeakers to emit strong audible sound.

Use of improved electroacoustic drivers of the present invention further provides for smaller and lighter electroacoustic drivers (as compared to conventional electro-dynamic drivers), which is advantageous for loudspeaker systems that are mobile (carried by hand) and also for use in vehicles (cars, boats, etc.)

The controlled motion of moveable panels can be performed with bidirectional force electromagnets or piezoelectric actuators.

Figure 1:
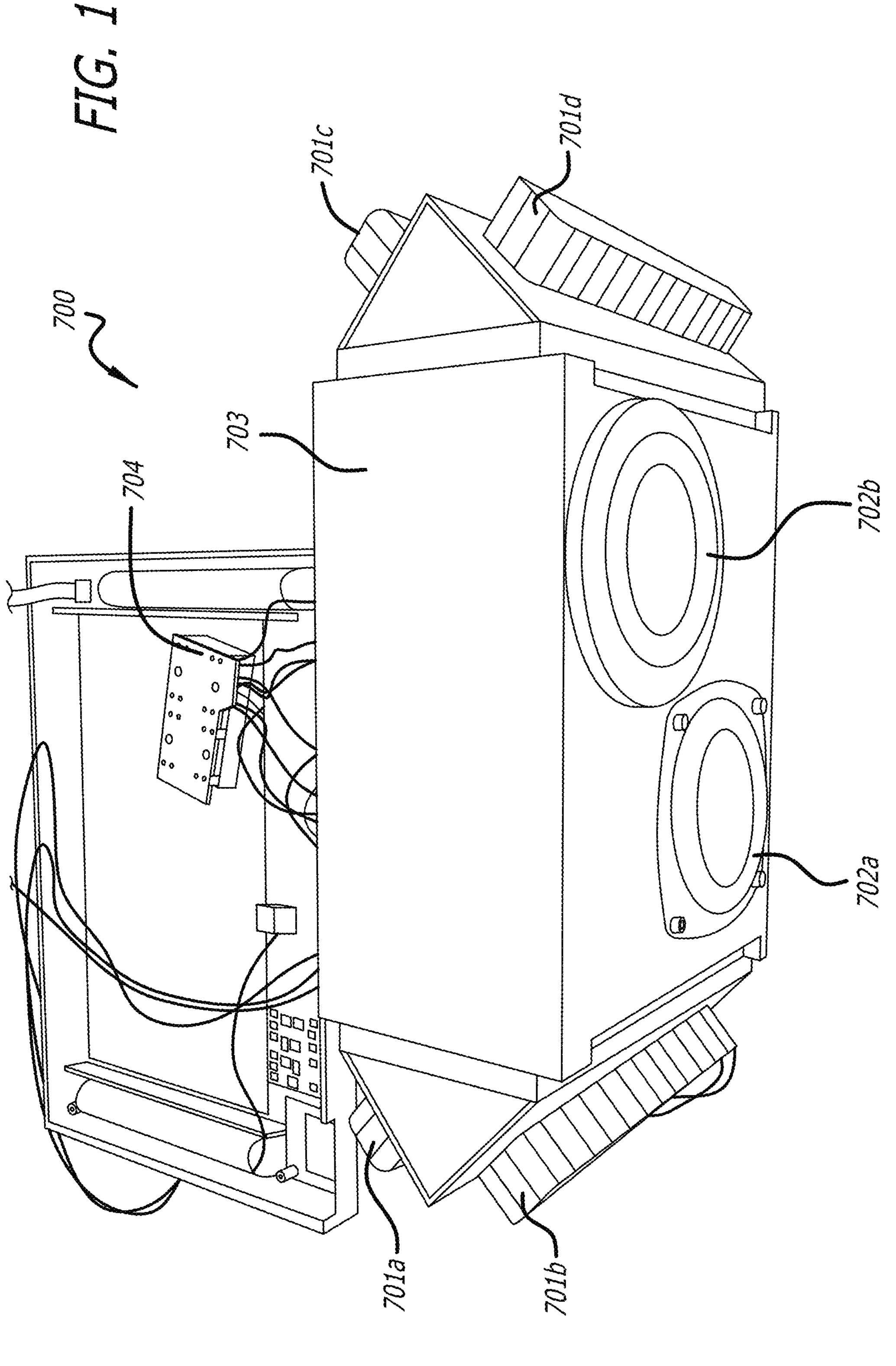
FIG. 1 depicts a photograph that is FIG. 7 of the Pinkerton PCT '438 Patent Application, which is a photograph of a loudspeaker having an arrangement of the four card stacks in arranged angles and four electro-dynamic drivers.
Figure 2A:
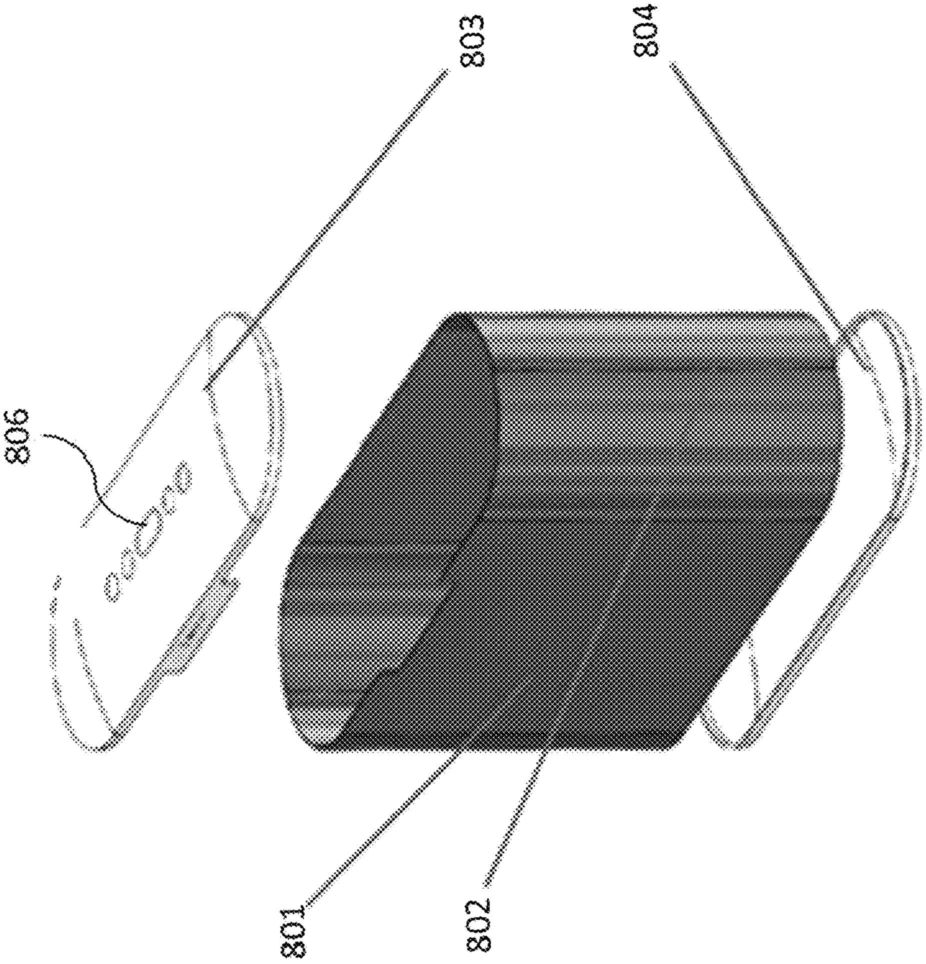
FIGS. 2A-2E are illustrations that are FIGS. 8A-8E of the Pinkerton PCT '438 Patent Application, which are illustrations of a loudspeaker showing a perspective, exploded perspective, frontal, right side, and top view, respectively.
Figure 2B:
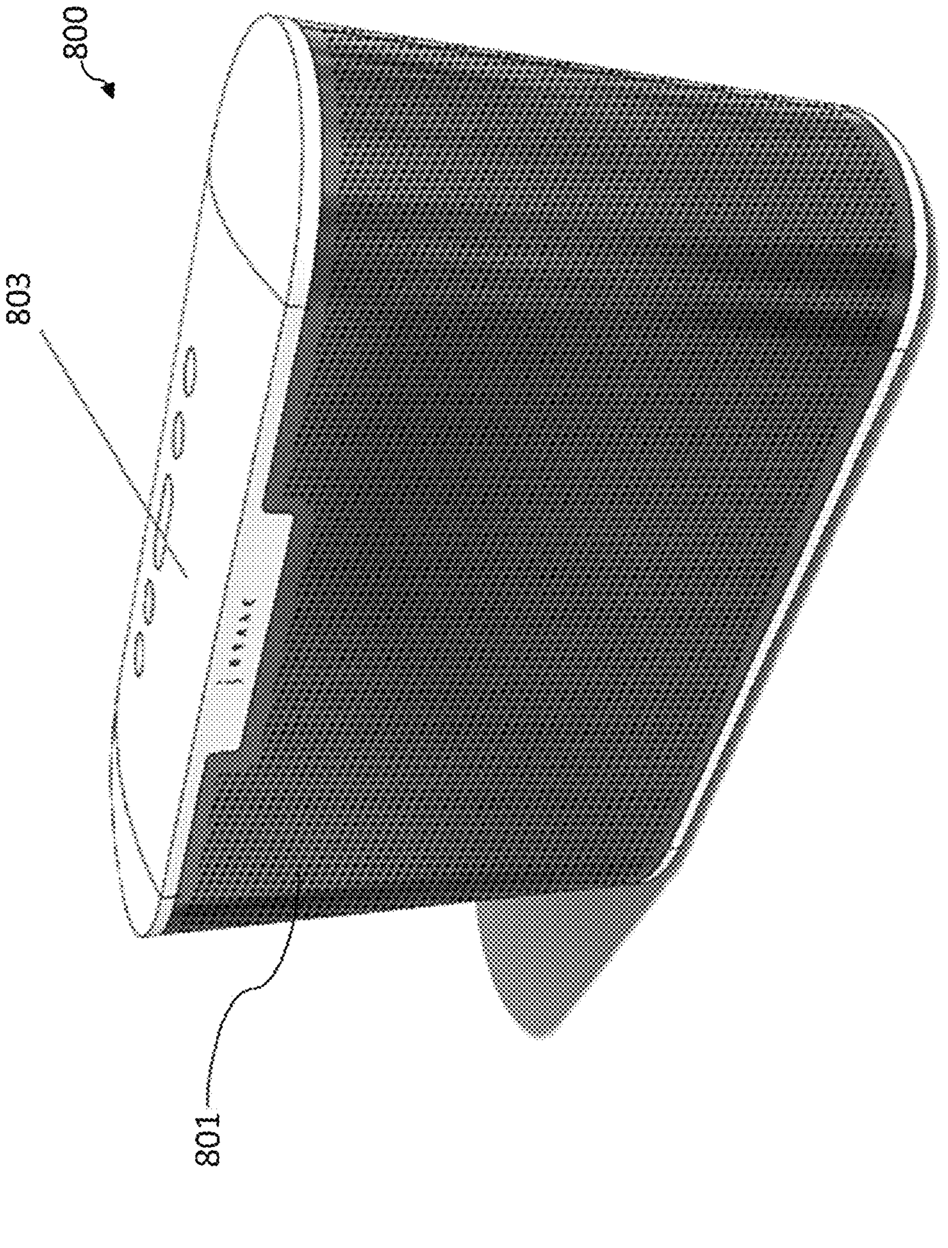
Figure 2C:
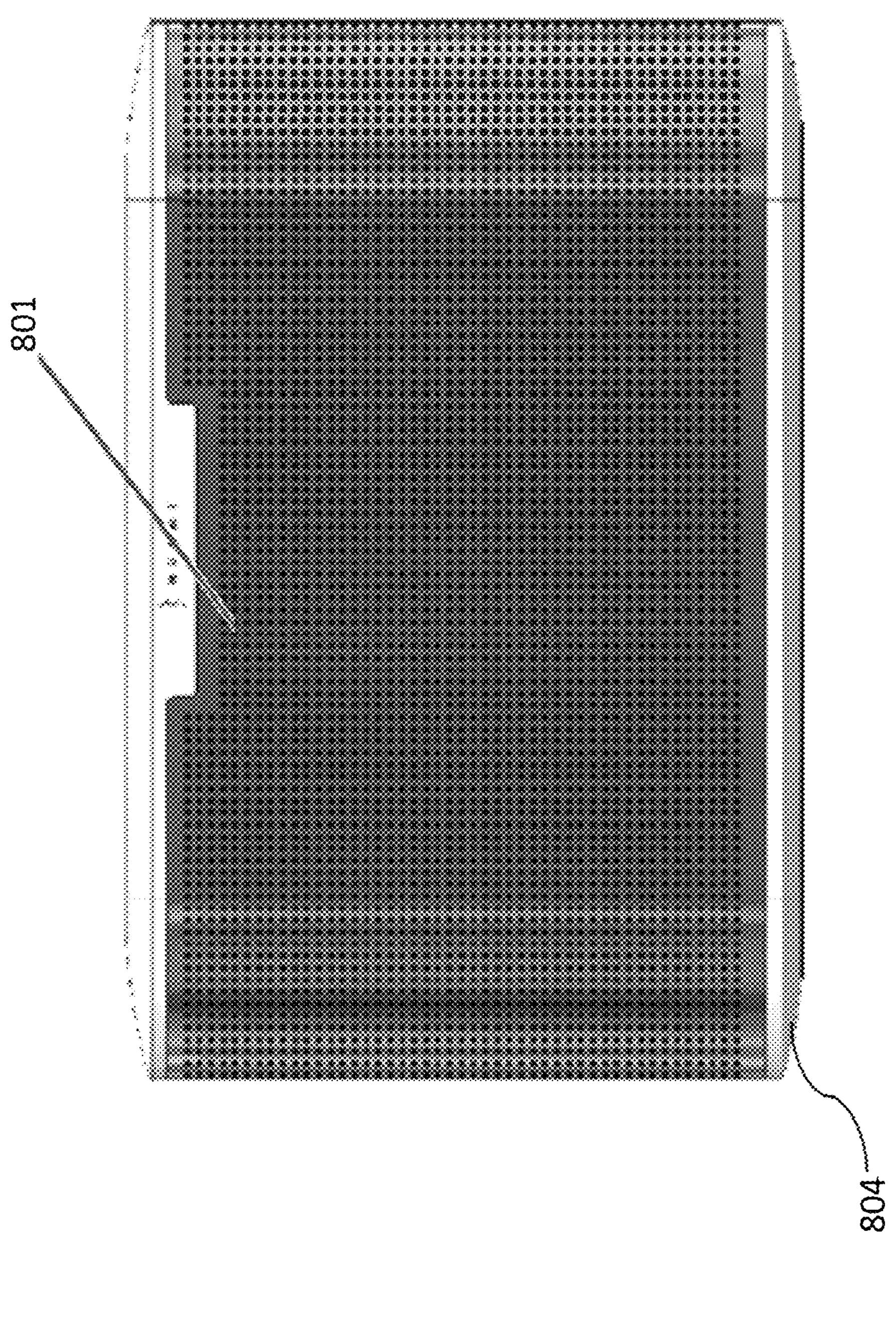
Figure 2D:
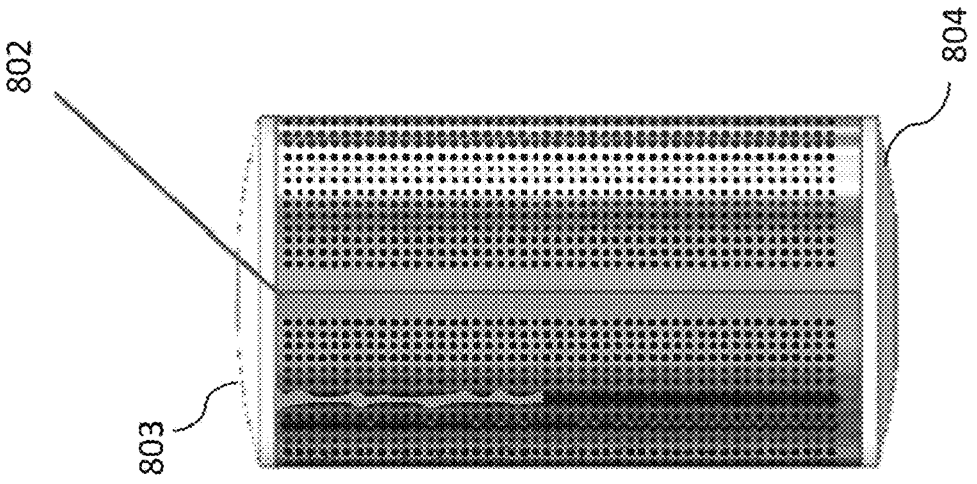
Figure 2E:
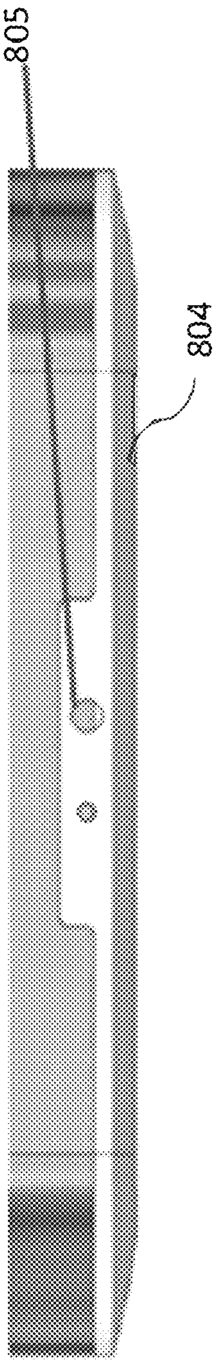
Figure 3A:
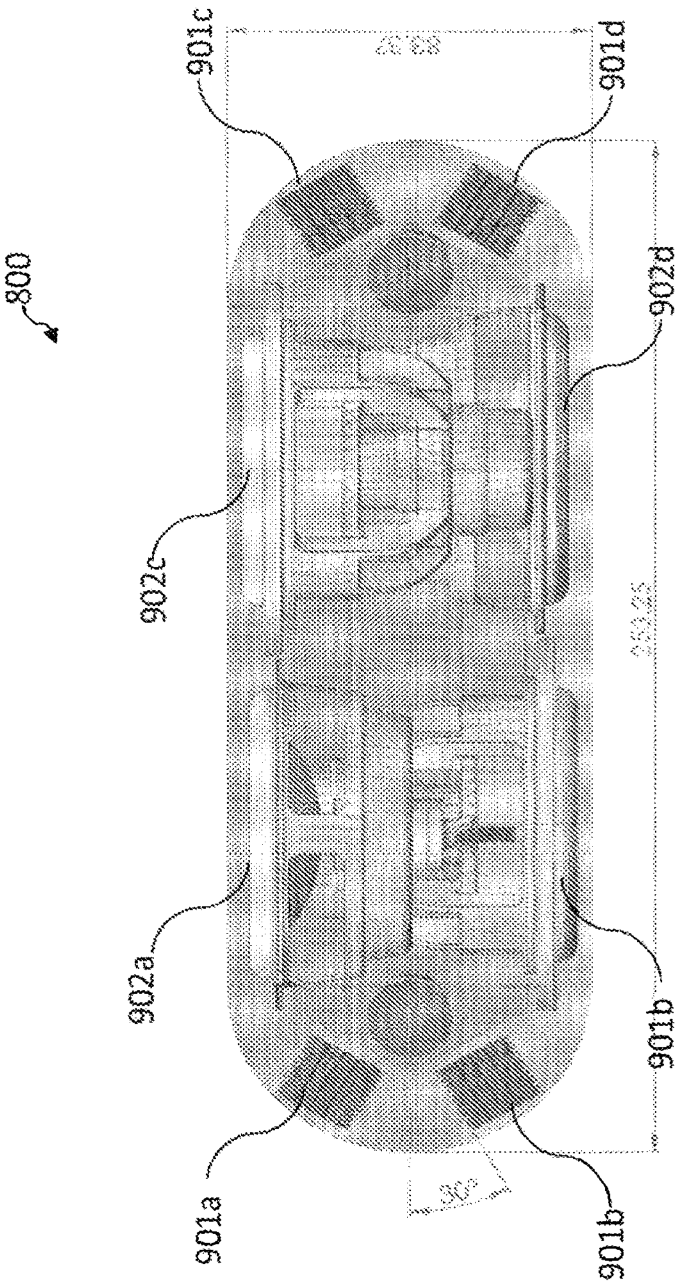
FIGS. 3A-3C are illustrations that are FIGS. 9A-8C of the Pinkerton PCT '438 Patent Application, which are illustrations of the loudspeaker, showing a top, frontal, and side view, respectively, with transparent walls of the loudspeaker having an arrangement of the four card stacks in arranged angles and four electro-dynamic drivers.
Figure 3B:
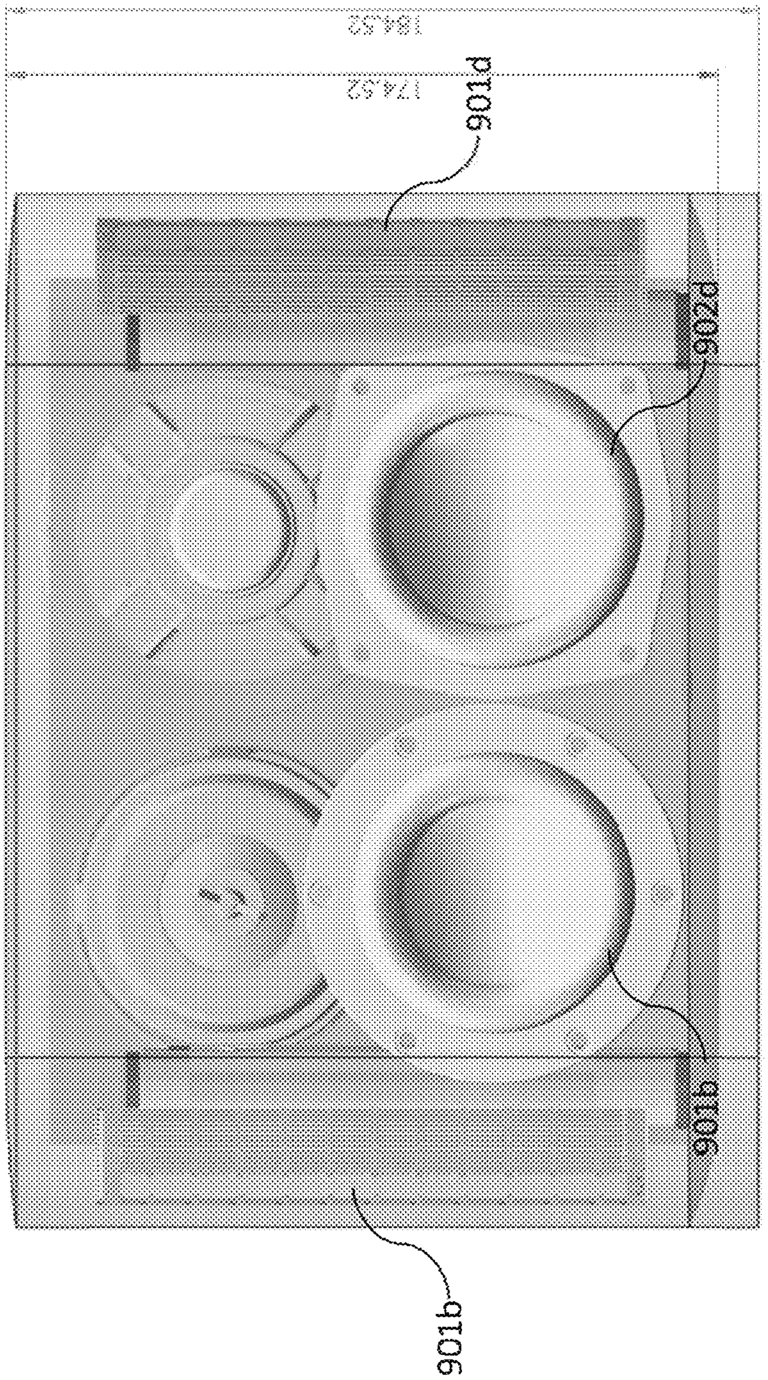
Figure 3C:
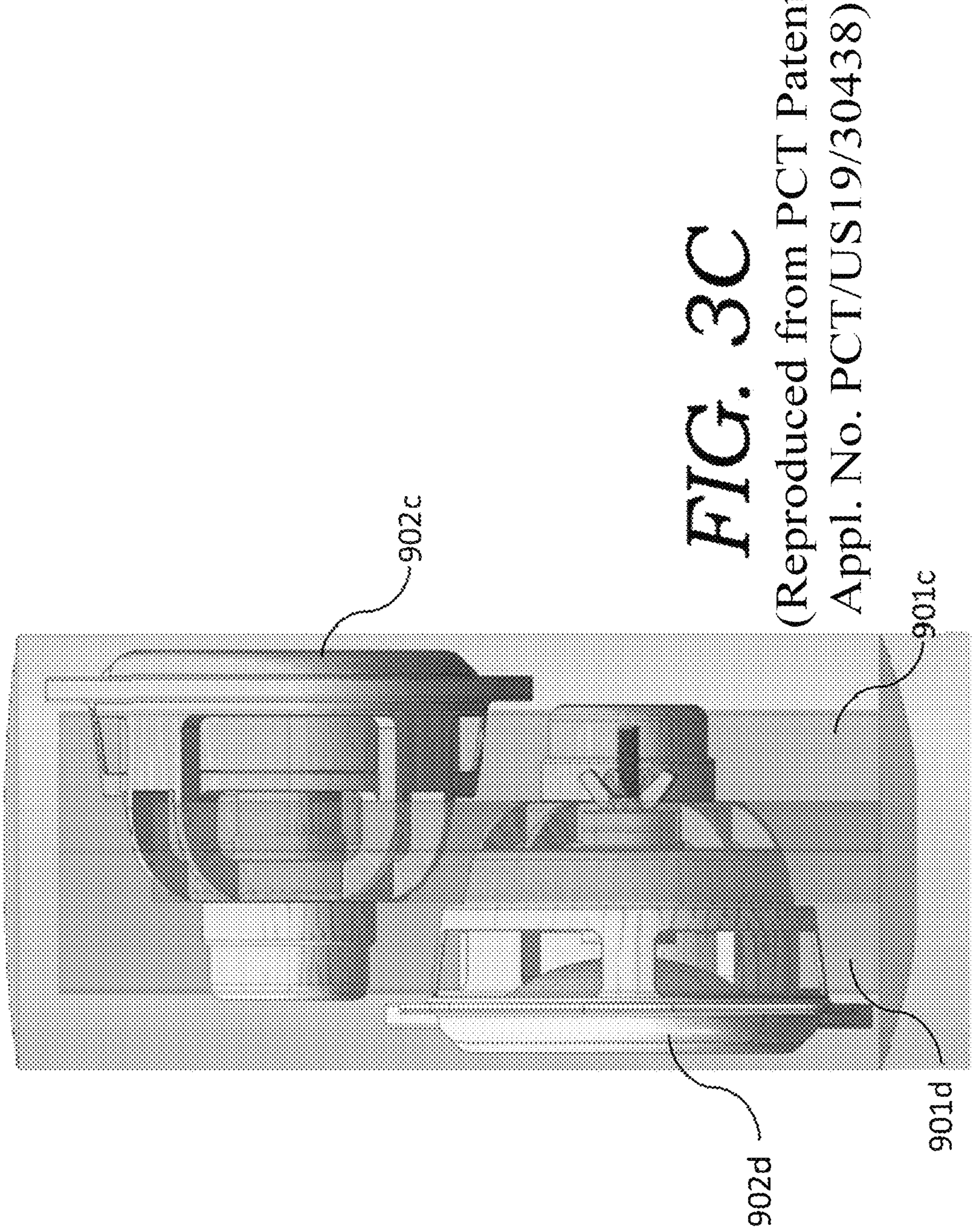
Figure 4:
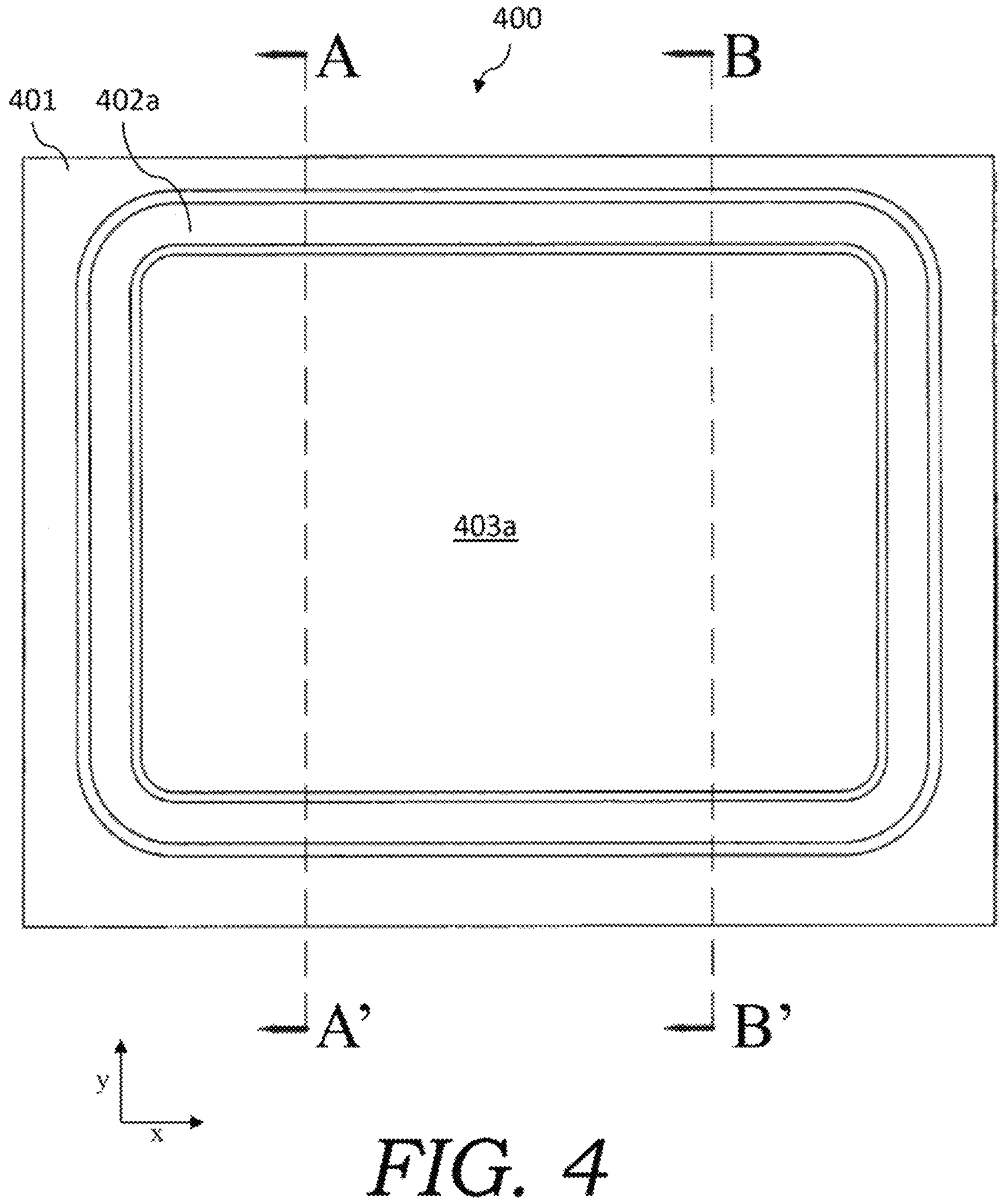
FIG. 4 is an illustration of a frontal view of an electroacoustic driver of the present invention.

FIG. 4 is an illustration of a frontal view of electroacoustic speaker 400 of the present invention, which utilizes a sealed chamber. The electroacoustic speaker 400 has an exterior portion 401 and a moveable panel 403*a* (that can be made of a polymer, such as plastic material) that is connected to the exterior portion 401 with an expandable boundary element 402*a* (which is generally an elastic material, such as rubber). Per the orientation of FIG. 4, the height of electroacoustic speaker 400 is in the y-direction (running down to up in the plane of the sheet of FIG. 4) and the width of electroacoustic speaker is in the x-direction (running left to right in the plane of the sheet of FIG. 4). FIG. 4 shows two cross-sections (A-A' and B-B') that are pointing in the negative x-direction. The z-direction is perpendicular to the plane of the sheet of FIG. 4 and is running outward toward the viewer of the sheet of FIG. 4. This x-, y-, z-direction orientation is maintained in FIGS. 5-11, to assist in a better understanding of the figures.

Figure 5:
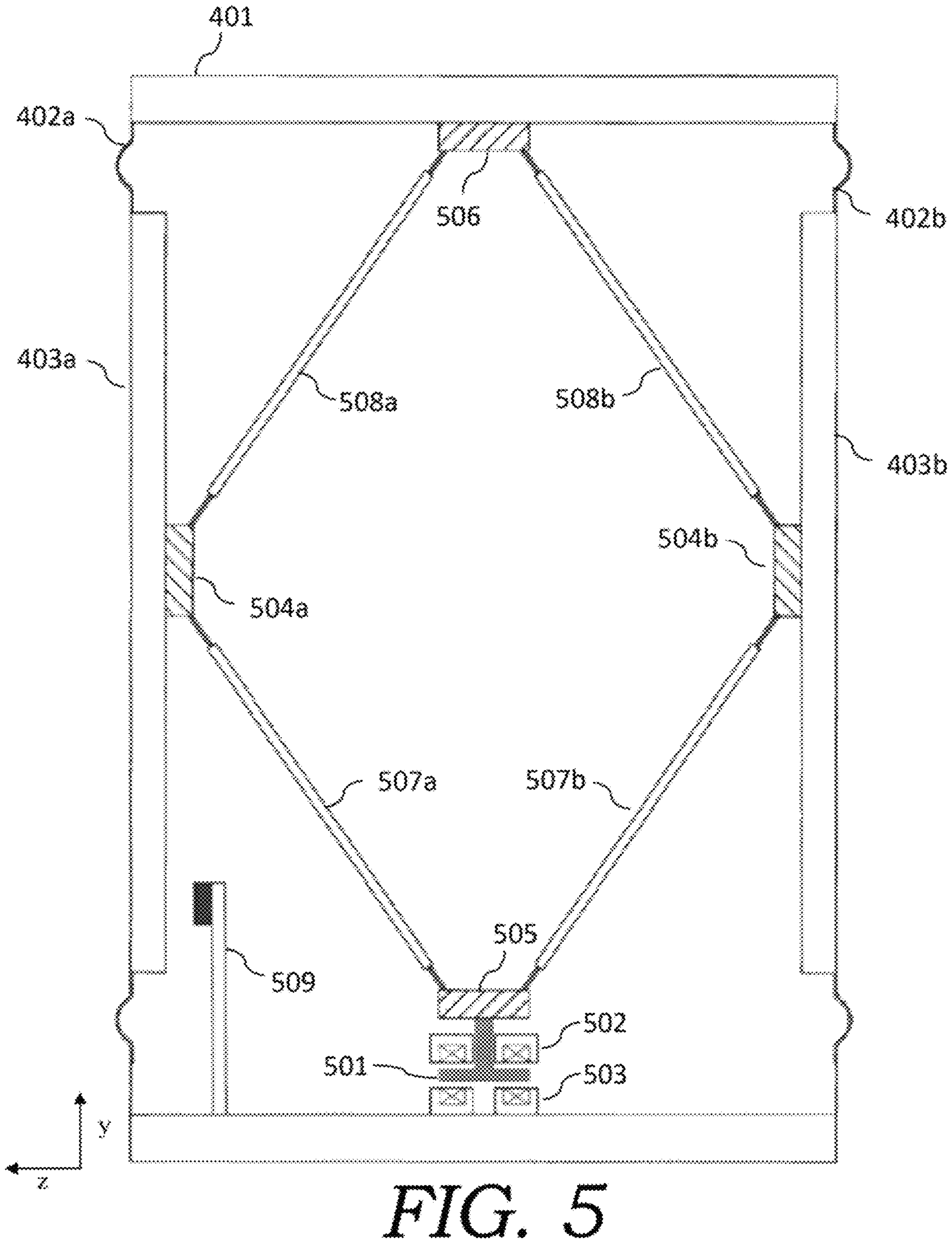
FIG. 5 is an illustration of a cross-section of the electroacoustic driver shown in FIG. 4 (taken along line B-B' shown in FIG. 4) that shows a bidirectional force electromagnet transducer and motion amplification mechanism utilized therein.

FIG. 5 is an illustration of a cross-section of electroacoustic speaker 400 taken along line B-B' shown in FIG. 4. Per the orientation of FIG. 5, the y-direction is running down to up in the plane of the sheet of FIG. 5, and the z-direction runs from right to left in the plane of the sheet of FIG. 5. The x-direction perpendicular to the plane of the sheet of FIG. 5 and is running inward away from the viewer of the sheet of FIG. 5.

Figure 6:
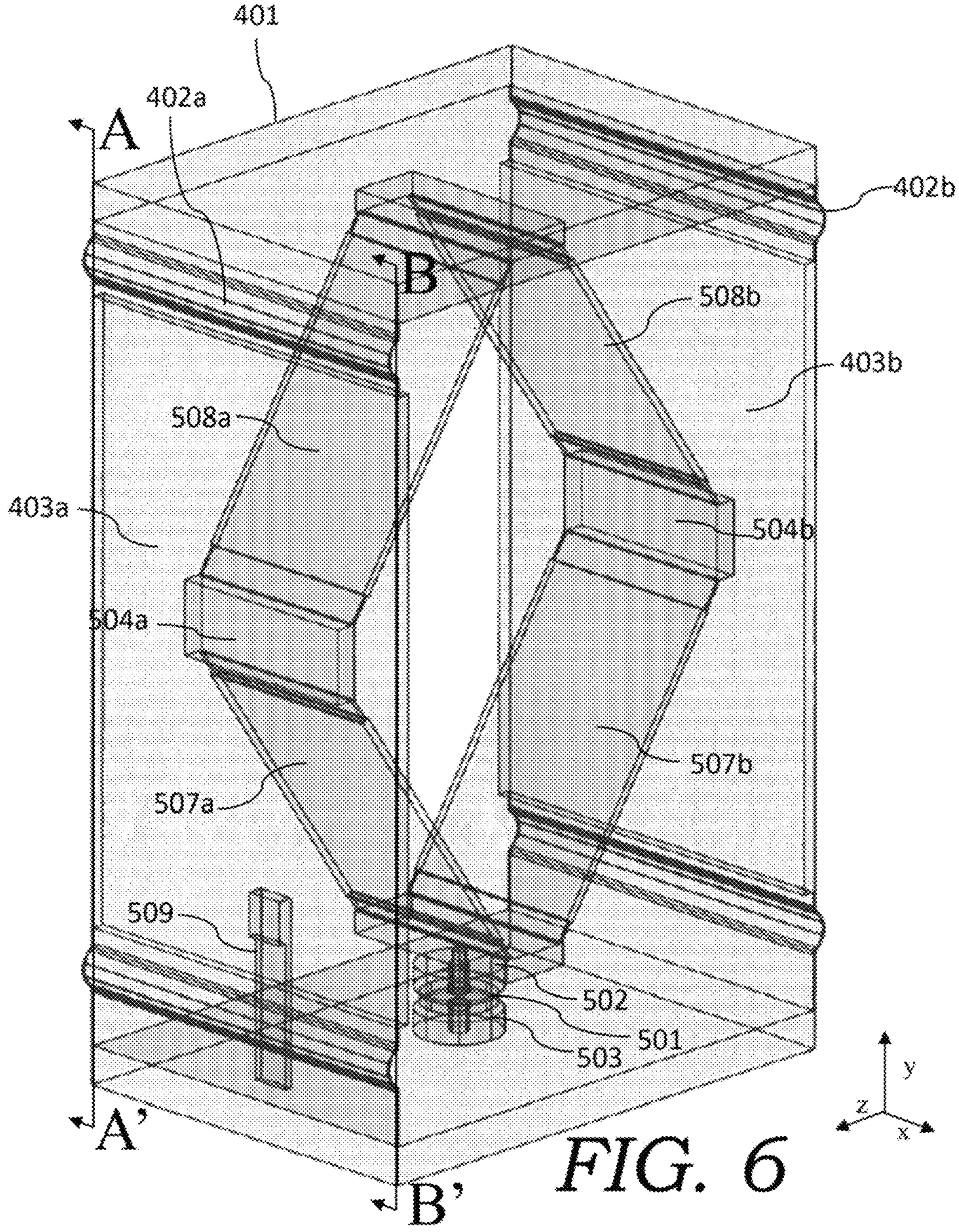
FIG. 6 is an illustration of the perspective view of the electroacoustic driver shown in FIG. 4 that shows the bidirectional force electromagnet transducer and motion amplification mechanism utilized therein.

FIG. 6 is an illustration of the perspective view of the electroacoustic speaker 400. Per the orientation of FIG. 5, the y-direction is running down to up in the plane of the sheet of FIG. 6. The x-direction and z-direction are directed in the orientation shown by the x-y-z axis shown in FIG. 6. To further oriented FIG. 6, cross-sections A-A' and B-B' from FIG. 4 are shown in FIG. 6.

Referring to FIGS. 5-6, these figures show the electroacoustic mechanism utilized in electroacoustic speaker 400. The electroacoustic mechanism utilizes a bidirectional force electromagnet that includes ferromagnetic disc 501 positioned between two electromagnets 502-503. As shown in FIGS. 5-6, disc 501 and electromagnets 502-503 are annular in shape. However, other shapes can be implemented. The electromagnets 502-503 are stationary with respect to electroacoustic speaker 400, and can be utilized to move the disc upward or downward in the y-direction. A person of skill in the art would readily understand how to utilize a bidirectional force electromagnet to so move the ferromagnetic disc, including the circuitry required for such electromagnet system. For instance, the bidirectional force electromagnet transducer arrangement is similar to that shown in U.S. Pat. No. 5,920,138.

As discussed below in FIGS. 8-9, the bidirectional movement of the ferromagnetic disc in an electromagnet transducer can be utilized directly to move the panels in an electroacoustic speaker. However, the mechanism shown in FIGS. 5-6 utilizes motional amplification mechanisms such as lever arms to multiply the amount of movement of the panels of the electroacoustic speaker.

As discussed above, FIG. 4 shows electroacoustic speaker 400 has an exterior portion 401 and a panel 403*a* (that can be made of a polymer, such as plastic material) that is connected to the exterior portion 401 with an expandable boundary element 402*a* (which is generally an elastic material, such as rubber). While not shown in FIG. 4 (due to its orientation), FIGS. 5-6 shows that there is an opposing panel 403*b* that is connected to the exterior portion 401 with an expandable boundary element 402*b*. Opposing panel 403*b* and expandable boundary element 402*b* are generally made of the same materials as panel 403*a* and expandable boundary element 402*a* and have the same dimensions. By doing so, any inertial forces that apply to panel 402*a* and panel 402*b* are equal but in opposite directions (which per FIGS. 5-6 would be in the z-direction) and thus will cancel each other so that the inertial forces of the overall electroacoustic speaker 400 are approximately zero. This force cancellation has important benefits that include preventing movement of the loudspeaker during its use.

A bidirectional force electromagnet transducer, such as one having ferromagnetic disc 501 and electromagnets 502-503 shown in FIGS. 5-6, will need significantly more electrical power to move the disc larger distances. This is because the magnetic force is decreased by a factor of the square of the distance between disc 501 and electromagnets 502-503. Thus, there is a significant advantage in limiting the movement of the disc 501 to a small distance (i.e., a small gap for the electromagnet), such as a maximum distance in the range of 0.5 mm to 2 mm, and, more particularly, a maximum distance in the range of 0.5 mm to 1 mm.

The magnetic force produced by a bidirectional force electromagnet transducer is normally proportional to the square of the current supplied to one of the two electromagnets on either side of disc 501. Stated another way, the magnetic force increases as the square of the input current to the electromagnet (the force is non-linear with current). One way to make the bidirectional force electromagnet transducer produce a force that is linear with input current is to supply electromagnet 502 and 503 with a constant current that is about half of the maximum current; then to increase the current of electromagnet 502 by a particular percentage (i.e., by x %) while decreasing the current to electromagnet 503 by the same particular percentage (i.e., by x %). This approach makes the magnetic force approximately linear with changes in electromagnet current and thus makes controlling the bidirectional force electromagnet transducer much less complicated. A position sensor can be used to track the position of disc 501 relative to electromagnets 502-503. This position information can be used in conjunction with an active feedback loop to make sure that disc 501 does not make physical contact with electromagnets 502-503 and also insure that disc 501 is moving the correct amount required to faithfully reproduce a desired audio output. A position sensor can also track the motion of the moveable panels to insure that the panels are moving the correct amount relative to the desired audio output (since a lever arm mechanism may introduce some differences in motion between disc 501 and one or more moveable panels).

While the disc 501 is moved in this maximum distance (between electromagnets 502-503), it is the distance of that panel 403*a* and opposing panel 403*b* moves, and their surface area (the area of panel 403*a* and opposing panel 403*b*) which generate the sound and intensity of sound that is emitted by electroacoustic speaker 400.

As shown in FIG. 5-6, when disc 501 is moved, this moves block 505 upward/downward in the y-direction (per the orientation of FIGS. 4-6). Block 505 is pivotably connected to lever arm 507*a*, which is pivotably connected to block 504*a* that is positioned on the interior of panel 403*a*. Block 504*a* is also pivotably connected to lever arm 508*a*, which is pivotably connected to block 506 that is attached to exterior portion 401 on the opposite side of electroacoustic speaker 400. A symmetrical arrangement is also shown in which block 505 is pivotably connected to lever arm 507*b*, which is pivotably connected to block 504*b* that is positioned on the interior of opposing panel 403*b*. Block 504*b* is also pivotably connected to lever arm 508*b*, which is pivotably connected to block 506. It should be noted that while the connection to disc 501 is shown in FIGS. 5-6 through block 505, disc 501 can be alternatively pivotably connected to lever arms 507*a*-507*b* directly or through some other mechanism. Likewise, the lever arms 507*a*-508*a* and 507*b*-508*b* can be alternatively pivotably connected to panel 403*a* and opposing panel 403*b*, respectively, directly or through some other mechanism. And, likewise, the lever arms 508*a*-508*b* can be alternatively pivotably connected to exterior portion 401 on the opposite side of electroacoustic speaker 400, directly or through some other mechanism.

By such arrangement, the movement of disc 501 in the y-direction will cause a movement of panel 403*a* and opposing panel 403*b* in the z-direction. As oriented in FIGS. 5-6, the movement of disc 501 in the positive y-direction will cause panel 403*a* to move outward relative to electroacoustic speaker 400 in a positive z-direction and will also cause opposing panel 403*b* to move outward relative to electroacoustic speaker 400 in a negative z-direction. The opposite movement of disc 501 (i.e., movement in the negative y-direction) will cause panel 403*a* to move inward relative to electroacoustic speaker 400 in a negative z-direction and will also cause opposing panel 403*b* to move inward relative to electroacoustic speaker 400 in a positive z-direction. Important in this movement is that the arrangement of lever-arms 507*a*-508*a* and 507*b*-508*b* will cause a greater magnitude of movement of panel 403*a* and opposing panel 403*b* in the z-direction than the movement of disc 505 in the y-direction. I.e., the movement will be in the range of 2-5 times greater. For instance, while the disc 501 may be moved a distance of 0.5 mm, the panel 403*a* and opposing panel 403*b* may be moved in the z-direction a distance of 1.0 mm (which depends on the angle at which these lever arms are connected). Moreover, the large force produced by the electromagnet transducer will result in the panel 403*a* and opposing panel 403*b* being efficiently moved, even though these panels have significantly greater surface area than the bidirectional force electromagnet actuator.

Moreover, block 506 can also be moved by a second bidirectional force electromagnet actuator (such as one having a disc and electromagnets similar to disc 501 and electromagnets 502-503) that can also be utilized in the mechanism to move panel 403*a* and opposing panel 403*b* even further inward and outward (i.e., in the positive and negative z-direction).

Because bidirectional force electromagnet transducers can be inherently unstable, they may require a position sensor (that monitors the movement of the ferromagnetic disc directly or indirectly such as looking at panel movement) and active feedback to work well. The disc can run into one of the electromagnets in the absence of a position sensor and an active feedback loop to monitor disc motion. Accordingly, electroacoustic speaker 400 can further have a position sensor 509 that monitors the movement of the panel 403*a* with a feedback loop, so as to better control the movement of panel 403*a* (and coordinately opposing panel 403*b*) for further control and improved sound quality of electroacoustic speaker 400. Position sensor 509 can alternatively monitor the movement of block 505 to ensure that disc 501 does not contact either electromagnet 502 or electromagnet 503.

For example, an embodiment of electroacoustic speaker 400 can have the following dimensions:

Area of each panel 403*a*-403*b*: 98 $cm^2$ (7 cm×14 cm).

Peak air volume displacement: 58 cc.

Peak chamber pressure: +/−6240 Pascal.

Lever arm ratio (ratio of movement of panel 403*a* in the z-direction to the movement of disc 501 in the y-direction): 1.7.

Outside radius of electromagnets 502-503: 14.2 mm.

Area of electromagnets 502-503: 6.3 $cm^2$.

At these dimensions, the area of the two panels 403*a*-403*b* that are driven by one bidirectional force electromagnet transducer is 196 $cm^2$, which is 31 times the area of electromagnets 502-503. This ratio is significantly higher than the area ratio of moveable cone area divided by voice coil actuator area of conventional electro-dynamic drivers, which is around 4.4 times. Thus, the area ratio of moveable panel area divided by electromagnet transducer area is 7 times higher than a conventional electro-dynamic driver. Significant advantages are achieved by having a panel to electromagnet panel area ratio of at least 10.

The maximum excursion of a typical electro-dynamic driver is +/−5 mm. For electroacoustic speaker 400 having the above dimensions, the maximum excursion of disc 501 is +/−0.42 mm, which is 11.9× less than traditional a comparable electro-dynamic driver due to the 7× area ratio times the 1.7× lever ratio. The relatively small excursion of disc 501 results in low power consumption of electroacoustic speaker 400 because the power consumption of a bidirectional force electromagnet transducer increases as the square of this disc excursion.

As shown from the above, disc 501 needs to move much less than conventional electro-dynamic drivers to produce as much or more sound pressure. Since bidirectional force electromagnet transducer average power consumption increases as the square of its peak displacement, it is very important to keep bidirectional force electromagnet transducer peak displacement under approximately +/−1 mm.

Another important fact is that bidirectional force electromagnet transducer mass and average power are highly sensitive to lever arm ratio. A higher lever arm ratio results in lower power consumption but higher bidirectional force electromagnet transducer mass.

It is believed that a lever arm ratio of 2-4 is a good compromise between mass and power. However, the optimal lever arm ratio will vary with each speaker design.

Levered Electroacoustic Drivers Utilizing Piezoelectric Actuators

Figure 7:
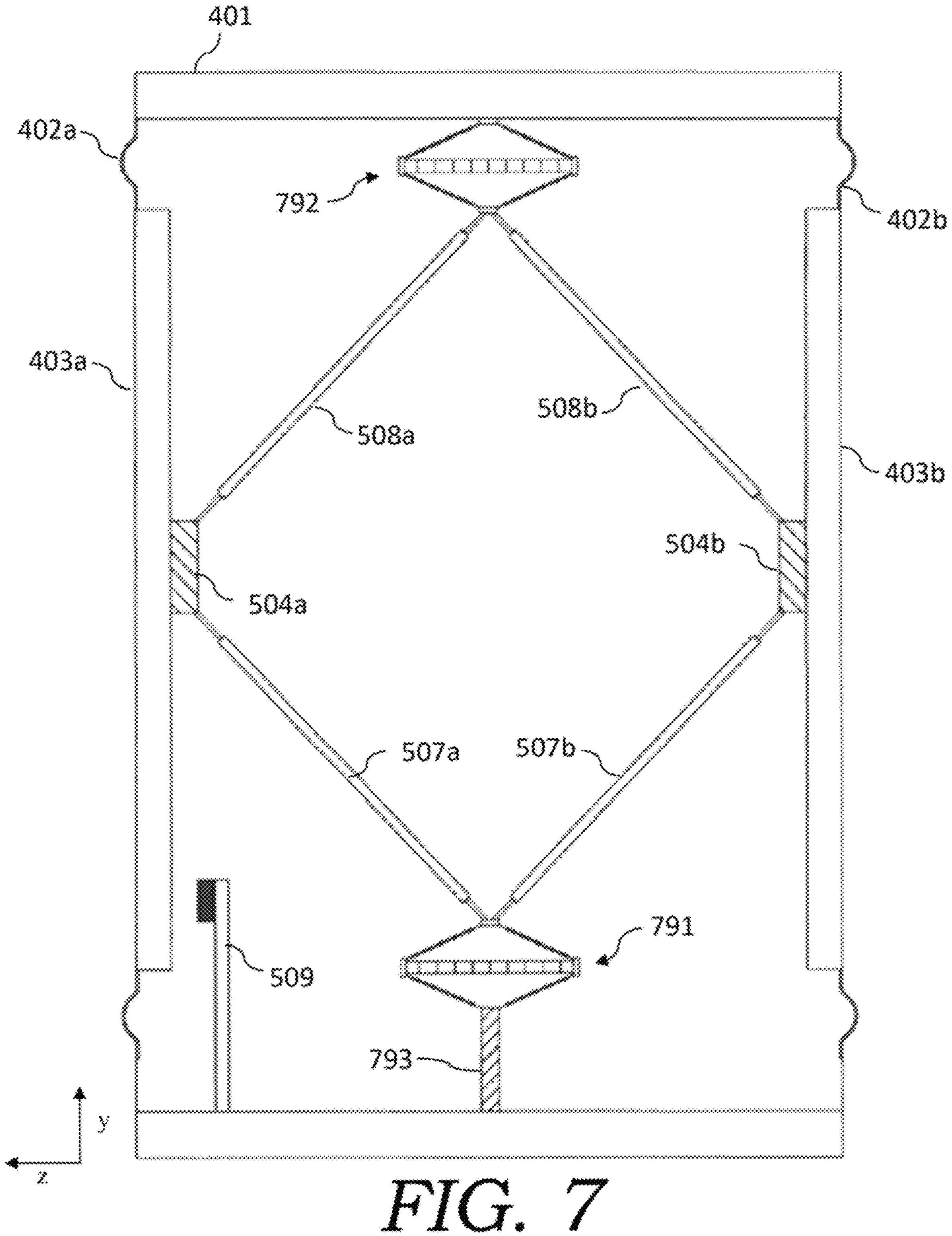
FIG. 7 is an electroacoustic driver of the present invention taken in the same cross-section of the electroacoustic driver shown in FIG. 4 (taken along line B-B' shown in FIG. 4) that uses a piezoelectric transducer in place a bidirectional force electromagnet transducer.

FIG. 7 is an alternative electroacoustic speaker taken in the same cross-section of electroacoustic speaker 400 shown in FIG. 4 (taken along line B-B' shown in FIG. 4). In this alternative embodiment, the bidirectional force electromagnet transducer has been replaced by a piezoelectric actuator 791. Moreover, a second piezo-electric actuator 792 is utilized and positioned in the arrangement shown in FIGS. 5-6 in place of block 506. A spacer 793 is used for positioning piezoelectric actuator 791 appropriately. Such spacer can be also used for piezoelectric actuator 792. (Moreover, such a spacer can likewise be utilized in the arrangement shown in FIGS. 5-6). The piezoelectric transducer 792 is shown with its own motion amplifying lever arm due to the small excursions of piezoelectric transducers (typically just 10-50 microns). This lever arm enables the piezoelectric transducer to move approximately 0.5 millimeters.

The piezoelectric actuators can then be utilized similar to the utilization of the bidirectional force electromagnet transducer(s) discussed above with respect to FIGS. 5-6.

Direct Drive Bidirectional Force Electromagnet Transducers

Figure 8:
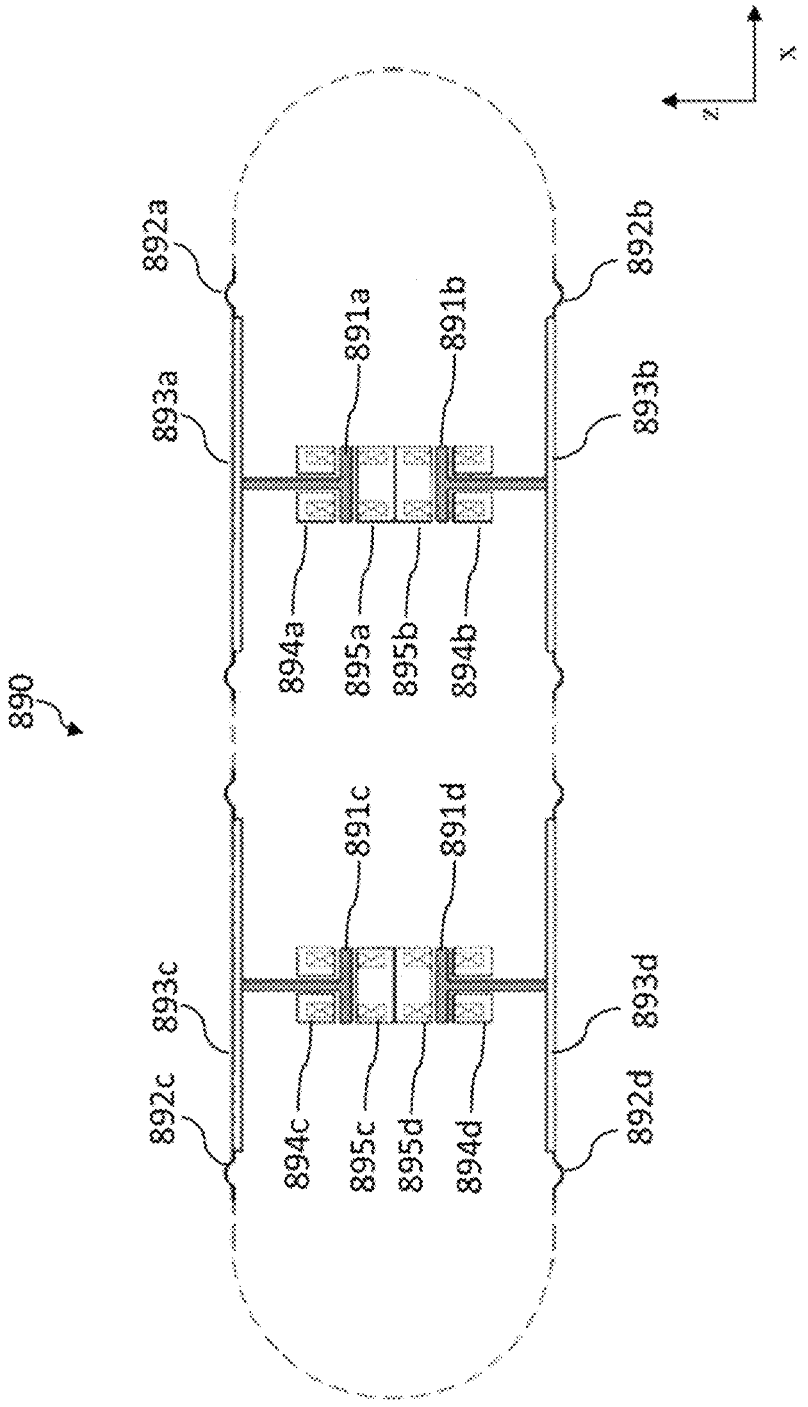
FIG. 8 is an illustration of an overhead view of a loudspeaker of the present invention utilizing four bidirectional force electromagnet transducers without motion amplification.
Figure 9:
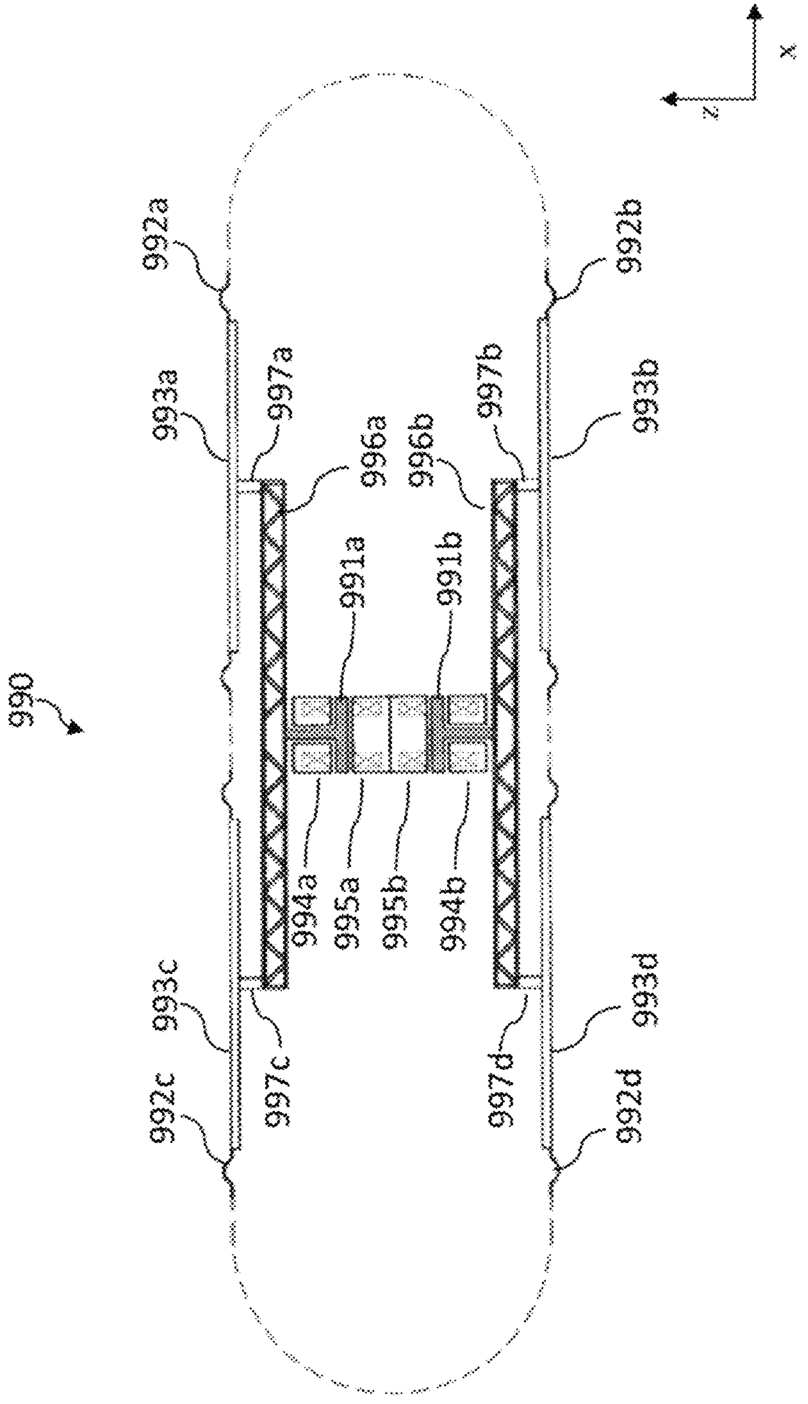
FIG. 9 is an illustration of an overhead view of a loudspeaker of the present invention utilizing two bidirectional force electromagnet transducers without motion amplification.

FIGS. 8-9 are each illustrations of a loudspeaker utilizing other alternative electroacoustic driver mechanisms (but without the lever arms described above). In these embodiments, the movement of the panels is done directly by bidirectional force electromagnet transducers. While the amount of panel movement is not as great (due to the absence of the lever arms), there remain advantages for using these transducers, particularly for low frequency sound applications. Again, these embodiments take advantage of moving panels with high surface area with only a small movement by the bidirectional force electromagnet transducers.

In FIG. 8, loudspeaker 890 has four panels 893*a*-893*d*, each of which is bounded by expandable boundary elements 892*a*-892*d*, respectively. These can be made of similar materials as discussed above for panel 403*a* and expandable boundary element 402*a* described above. In the orientation of FIG. 8, panels 893*a*-893*d* move outward and inward relative to loudspeaker 890 in the z-direction. By symmetry, the inertial forces caused by the movement of these panels will cancel out with one another, which will reduce the mechanical vibrations of loudspeaker 890.

In loudspeaker 890, there are four bidirectional force electromagnet transducers, each of which has a ferromagnetic disc and a two electromagnets, similar as described above for the electroacoustic speaker 400 described above. Specifically, (a) the movement of panel 893*a* is controlled by the bidirectional force electromagnet transducer made up of disc 891*a* and electromagnets 894*a*-895*a*, (b) the movement of panel 893*b* is controlled by the bidirectional force electromagnet transducer made up of disc 891*b* and electromagnets 894*b*-895*b*, (c) the movement of panel 893*c* is controlled by the bidirectional force electromagnet transducer made up of disc 891*c* and electromagnets 894*c*-895*c*, and (d) the movement of panel 893*d* is controlled by the bidirectional force electromagnet transducer made up of disc 891*d* and electromagnets 894*d*-895*d*.

In FIG. 9, loudspeaker 990 has four panels 993*a*-993*d*, each of which is bounded by expandable boundary elements 992*a*-992*d*, respectively. These are like the four panels 893*a*-893*d* and expandable boundary elements 892*a*-892*d* and can be made of similar materials as discussed above for panel 403*a* and expandable boundary element 402*a* described above. In the orientation of FIG. 9 (and similar the arrangement in FIG. 8), panels 993*a*-993*d* move outward and inward relative to loudspeaker 990 in the z-direction. By symmetry, the inertial forces caused by the movement of these panels will cancel out with one another, which is advantageous to the use of loudspeaker 990.

In loudspeaker 990, there are two bidirectional force electromagnet transducers, each of which has a disc and a two electromagnets, similar as described above for the electroacoustic speaker 400 described above. Specifically, (a) the movement of panels 993*a* and 993*c* is controlled by the bidirectional force electromagnet transducer made up of disc 991*a* and electromagnets 994*a*-995*a* and (b) the movement of panels 993*b* and 993*d* is controlled by the bidirectional force electromagnet transducer made up of disc 991*b* and electromagnets 994*b*-995*b*. When disc 991*a* is moved in the z-direction (by utilizing electromagnets 994*a*-995*a* to create a magnetic force), it applies a force in the positive or negative z-direction to beam 996*a*, which in turn coordinately applies a force in the same positive or negative z-direction to each of beams 997*a* and 997*c* (which then move panels 993*a* and 993*c*, respectively, in the same positive or negative z-direction).

By symmetry, when disc 991*b* is moved in the z-direction (by utilizing electromagnets 994*b*-995*b* to create a magnetic force), it applies a force in the negative or positive z-direction to beam 996*b*, which in turn coordinately applies a force in the same negative or positive z-direction to each of beams 997*b* and 997*d* (which then move panels 993*b* and 993*d*, respectively, in the same negative or positive z-direction).

Generally, by having disc 991*a* and disc 991*b* move concurrently in the same but opposite z-directions, this will result in a net zero overall inertial forces applied to loudspeaker 990. For instance, if disc 991*a* is moved in the positive z-direction and disc 991*b* is moved in an equal amount in the negative z-direction, this will result in panels 993*a*-993*d* all moving outward from loudspeaker 990 with panels 993*a* and 993*c* moving in a positive z-direction and panels 993*b* and 993*d* moving in an equal but negative z-direction.

Alternative Embodiment Utilizing Lever Arm

Figure 10:
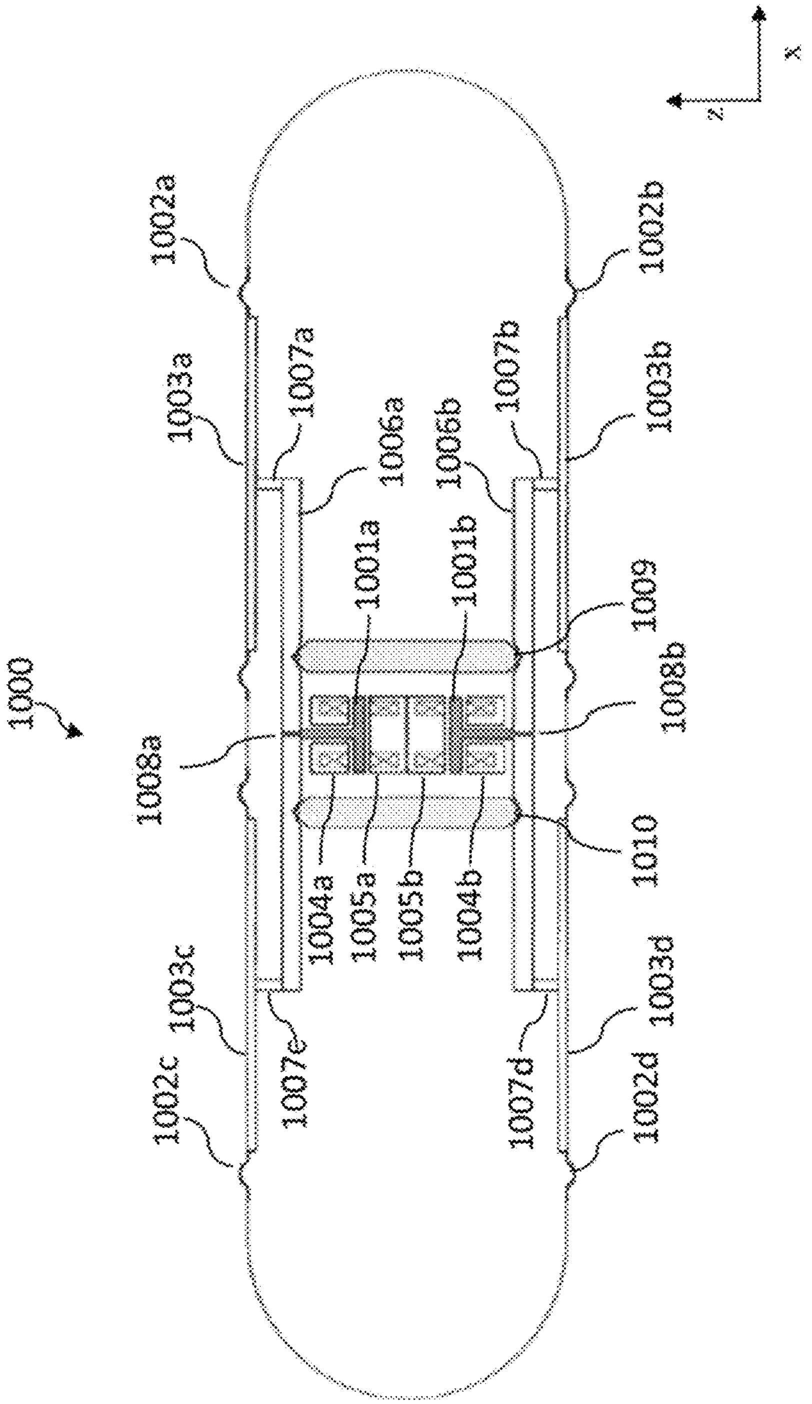
FIG. 10 is an illustration of an overhead view of a loudspeaker utilizing two bidirectional force electromagnet transducers with a compact motion amplification mechanism.
Figure 11:
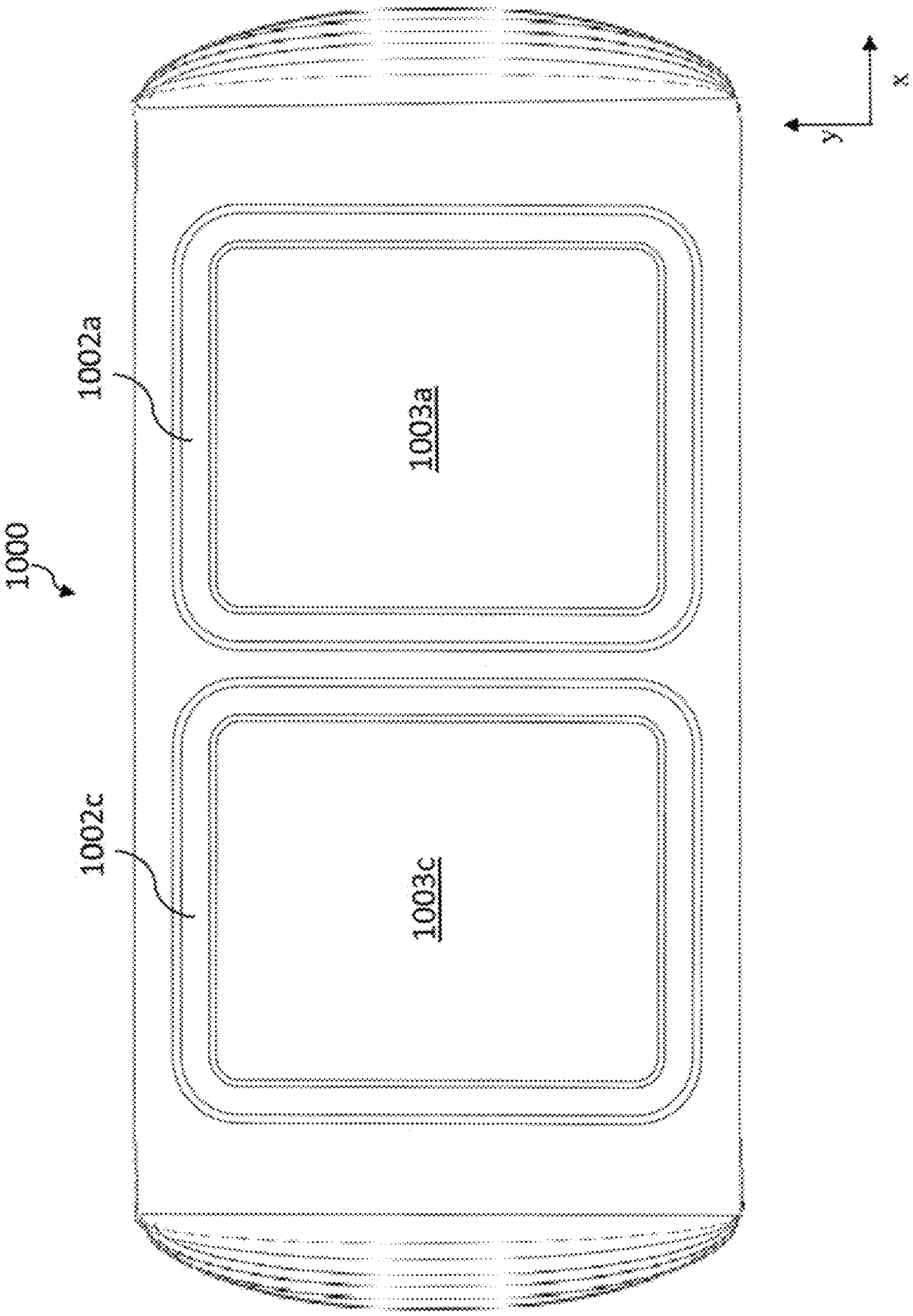
FIG. 11 is an illustration of a frontal view of the loudspeaker shown in FIG. 10.

FIGS. 10-11 are illustrations of loudspeaker 1000 that utilizes two bidirectional force electromagnet transducers with a compact motion amplification mechanism. Loudspeaker 1000 has many of the same features as loudspeaker 990 with (a) four panels 1003*a*-1003*d* of loudspeaker 1000 corresponding, respectively, to panels 993*a*-993*d* of loudspeaker 990, (b) expandable boundary elements 1002*a*-1002*d* of loudspeaker 1000 corresponding, respectively, to expandable boundary elements 992*a*-992*d* of loudspeaker 990; (c) the bidirectional force electromagnet transducer made up of disc 1001*a* and electromagnets 1004*a*-1005*a* in loudspeaker 1000 corresponding to the bidirectional force electromagnet transducer made up of disc 991*a* and electromagnets 994*a*-995*a* in loudspeaker 990; and (d) the bidirectional force electromagnet transducer made up of disc 1001*b* and electromagnets 1004*b*-1005*b* in loudspeaker 1000 corresponding to the bidirectional force electromagnet transducer made up of disc 991*b* and electromagnets 994*b*-995*b* in loudspeaker 990.

When disc 1001*a* is moved in the z-direction (by utilizing electromagnets 1004*a*-1005*a* to create a magnetic field), it applies a force in the positive or negative z-direction at hinge 1008*a* of hinged beam 1006*a*. As hinged beam 1006*a* is pivoted on each side by fulcrums 1009-1010, this applies a force in the opposite z-direction to each of beams 1007*a* and 1007*c* (which then move panels 1003*a* and 1003*c*, respectively, in the opposite z-direction of the movement of disc 1001*a*). By locating the fulcrums 1009-1010 closer to hinge 1008*a* than beams 1007*a* and 1007*c*, there is an increase in the movement of panels 1003*a* and 1003*c* as compared to the movement of disc 1001*a*.

By symmetry, when disc 1001*b* is moved in the z-direction (by utilizing electromagnets 1004*b*-1005*b* to create a magnetic field), it applies a force in the negative or positive z-direction at hinge 1008*b* of hinged beam 1006*b*. As hinged beam 1006*b* is pivoted on each side by fulcrums 1009-1010, this applies a force in the opposite z-direction to each of beams 1007*b* and 1007*d* (which then move panels 1003*b* and 1003*d*, respectively, in the opposite z-direction of the movement of disc 1001*b*). By locating the fulcrums 1009-1010 closer to hinge 1008*b* than beams 1007*b* and 1007*d*, there is an increase in movement of the 1003*b* and 1003*d* as compared to the movement of disc 1001*b*.

Generally, by having disc 1001*a* and disc 1001*b* move concurrently in the same but opposite z-directions, this will result in a net zero overall inertial forces applied to loudspeaker 1000. For instance, if disc 1001*a* is moved in the negative z-direction and disc 1001*b* is moved in an equal amount in the positive z-direction, this will result in panels 1003*a*-1003*d* all moving outward from loudspeaker 1000 with panels 1003*a* and 1003*c* moving in a positive z-direction and panels 1003*b* and 1003*d* moving in an equal but negative z-direction. Thus, to move panels 1003*a*-1003*d* outward, discs 1001*a*-1001*b* are both moved inward relative to loudspeaker 1000, while, to move panels 1003*a*-1003*d* inward, discs 1001*a*-1001*b* are both moved outward relative to loudspeaker 1000.

FIG. 11 is an illustration of a frontal view of the loudspeaker 1000. It should be noted that this looks similar to the frontal view of each of loudspeakers 890 and 990.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. An electroacoustic loudspeaker comprising:
- (a) an electroacoustic driver comprising a bidirectional force electromagnet transducer, wherein
  - (i) the bidirectional force electromagnet transducer comprises a ferromagnetic disc, a first electromagnet, and a second electromagnet,
  - (ii) the first electromagnet is operable to pull the ferromagnetic disc in a first direction,
  - (iii) the second electromagnetic is operable to pull in a second direction, and
  - (iv) the first direction and the second direction are oppositely directed;
- (b) a sealed chamber having a first movable panel, wherein
  - (i) the first movable panel is bounded by a first expandable boundary material so that the first movable panel can move inward and outward relative to the sealed chamber, (ii) the electroacoustic driver is operatively connected to the first movable panel for moving the first movable panel inward and outward relative to the sealed chamber, and (iii) the movement of the first movable panel by the electroacoustic driver is operable for generating sound by the electroacoustic loudspeaker; and (c) a position sensor to track the position of the ferromagnetic disc, the first movable panel, or both.

2. The electroacoustic loudspeaker of claim 1, wherein (a) the sealed chamber has a second movable panel;

(b) the first movable panel and the second movable panel are on opposing sides of the sealed chamber;

(c) the second movable panel is bounded by a second expandable boundary material so that the second movable panel can move inward and outward relative to the sealed chamber; and (d) the electroacoustic driver is operatively connected to first movable panel and the second movable panel for moving the first movable panel and the second movable panel, wherein (i) the electroacoustic driver is operable for simultaneously moving the first movable panel and the second movable panel inward relative to the sealed chamber, (ii) the electroacoustic driver is operable for simultaneously moving the first movable panel and the second movable panel outward relative to the sealed chamber, and (iii) the movement of the second movable panel by the electroacoustic driver is operable for generating sound by the electroacoustic loudspeaker.

3. The electroacoustic loudspeaker of claim 1, wherein the electroacoustic driver is operable for generating sound below 1000 Hz by the electroacoustic loudspeaker.

4. The electroacoustic loudspeaker of claim 1, wherein the electroacoustic driver is operable for generating sound below 500 Hz by the electroacoustic loudspeaker.

5. The electroacoustic loudspeaker of claim 1, wherein the electroacoustic driver is operable for generating sound below 300 Hz by the electroacoustic loudspeaker.

6. The electroacoustic loudspeaker of claim 1, wherein the bidirectional force electromagnet transducer is a direct drive bidirectional force electromagnet transducer.

7. The electroacoustic loudspeaker of claim 1, wherein the bidirectional force electromagnet transducer has a maximum distance of range of movement of 0.5 mm to 2 mm.

8. The electroacoustic loudspeaker of claim 1, wherein the bidirectional force electromagnet transducer has a maximum distance of range of movement of 0.5 mm to 1 mm.

9. The electroacoustic loudspeaker of claim 1 further comprising a motion amplifier.

10. The electroacoustic loudspeaker of claim 2 further comprising a motion amplifier.

11. The electroacoustic loudspeaker of claim 10, wherein the motion amplifier comprises one or more lever arms operatively connecting the electroacoustic driver and the first movable panel and the second moveable panel.

12. The electroacoustic loudspeaker of claim 10, wherein the motion amplifier is capable of amplifying distance of movement of the first movable panel and distance of motion of the second movable panel to two to five times greater than distance of movement of the bidirectional force electromagnet transducer or of the electroacoustic driver.

13. The electroacoustic loudspeaker of claim 10, wherein the position sensor is a sensor to track the position of the first movable panel, or both the first movable panel and the second movable panel.

14. The electroacoustic loudspeaker of claim 13 further comprising an active feedback for controlling the movement of the first movable panel and the second movable panel.

15. A method comprising:

(a) selecting an electroacoustic loudspeaker comprising an electroacoustic driver, wherein (i) the electroacoustic driver comprises a bidirectional force electromagnet transducer, and (ii) the bidirectional force electromagnet transducer comprises a ferromagnetic disc, a first electromagnet, and a second electromagnet;

(b) utilizing the bidirectional force electromagnet transducer to move a first movable panel of the electroacoustic loudspeaker to generate sound, wherein (i) the first electromagnet pulls the ferromagnetic disc in a first direction, (ii) the second electromagnetic pulls in a second direction, (iii) the first direction and the second direction are oppositely directed, and (iv) the sound generated is below 1000 Hz; and (c) utilizing a position sensor to track the position of the ferromagnetic disc, the first movable panel, or both.

16. A method comprising:

(a) selecting an electroacoustic loudspeaker comprising an electroacoustic driver, wherein (i) the electroacoustic driver comprises a bidirectional force electromagnet transducer, and (ii) the bidirectional force electromagnet transducer comprises a ferromagnetic disc, a first electromagnet, and a second electromagnet;

(b) utilizing the bidirectional force electromagnet transducer to move a first movable panel of the electroacoustic loudspeaker to generate sound, wherein (i) the first electromagnet pulls the ferromagnetic disc in a first direction, (ii) the second electromagnetic pulls in a second direction, and (iii) the first direction and the second direction are oppositely directed;

(c) utilizing a position sensor to track the position of the ferromagnetic disc, the first movable panel, or both; and (d) utilizing the bidirectional force electromagnet transducer to move a second movable panel of the electroacoustic loudspeaker to generate sound, wherein (i) the electroacoustic driver simultaneously moves the first movable panel and the second movable panel inward relative to the sealed chamber, and (ii) the electroacoustic driver simultaneously moves the first movable panel and the second movable panel outward relative to the sealed chamber.

17. The method of claim 15, wherein the sound generated is below 500 Hz.

18. The method of claim 15, wherein the sound generated is below 300 Hz.

19. The method of claim 15, wherein the bidirectional force electromagnet transducer is a direct drive bidirectional force electromagnet transducer.

20. The method of claim 15, wherein the bidirectional force electromagnet transducer has a maximum distance of range of movement of 0.5 mm to 2 mm.

21. The method of claim 15, wherein the bidirectional force electromagnet transducer has a maximum distance of range of movement of 0.5 mm to 1 mm.

22. A method comprising:
(a) selecting an electroacoustic loudspeaker comprising an electroacoustic driver, wherein
(i) the electroacoustic driver comprises a bidirectional force electromagnet transducer,
(ii) the bidirectional force electromagnet transducer comprises a ferromagnetic disc, a first electromagnet, and a second electromagnet, and
(iii) the electroacoustic drive further comprises a motion amplifier;
(b) utilizing the bidirectional force electromagnet transducer to move a first movable panel of the electroacoustic loudspeaker to generate sound, wherein
(i) the first electromagnet pulls the ferromagnetic disc in a first direction,
(ii) the second electromagnetic pulls in a second direction, and
(iii) the first direction and the second direction are oppositely directed;
(c) utilizing a position sensor to track the position of the ferromagnetic disc, the first movable panel, or both; and
(d) utilizing the motion amplifier to amplify the movement of the first movable panel relative to movement of the bidirectional force electromagnet transducer.

23. The method of claim 16, wherein
(a) the electroacoustic drive further comprises a motion amplifier; and
(b) the method further comprises utilizing the motion amplifier to amplify the movement of the first movable panel and the second movable panel relative to movement of the bidirectional force electromagnet transducer.

24. The method of claim 23, wherein
(a) the motion amplifier comprises one or more lever arms operatively connecting the electroacoustic driver and the first movable panel and the second moveable panel; and
(b) the method further comprises utilizing the lever arms to amplify the movement of the first movable panel and the second movable panel relative to movement of the bidirectional force electromagnet transducer.

25. The method of claim 23 further comprising utilizing the motion amplifier to amplify distance of movement of the first movable panel and distance of motion of the second movable panel to two to five times greater than distance of movement of the bidirectional force electromagnet transducer of the electroacoustic driver.

26. The method of claim 23 further comprising utilizing the position sensor to track the position of the first movable panel or both the first movable panel and the second movable panel.

27. The method of claim 26 further comprising utilizing an active feedback to control the movement of the first movable panel and the second movable panel.

28. The method of claim 15 further comprising utilizing the bidirectional force electromagnet transducer or piezoelectric transducer to move a second movable panel of the electroacoustic loudspeaker to generate the sound.

29. A method of comprising:
(a) an electroacoustic loudspeaker comprises: comprising
(i) an electroacoustic driver, wherein
(A) the electroacoustic driver comprises a bidirectional force electromagnet transducer,
(B) the bidirectional force electromagnet transducer comprises a ferromagnetic disc, a first electromagnet, and a second electromagnet,
(C) the first electromagnet is operable to pull the ferromagnetic disc in a first direction,
(D) the second electromagnetic is operable to pull in a second direction, and
(E) the first direction and the second direction are oppositely directed;
(ii) a sealed chamber having a first movable panel, wherein
(A) the first movable panel is bounded by a first expandable boundary material so that the first movable panel can move inward and outward relative to the sealed chamber,
(B) the electroacoustic driver is operatively connected to the first movable panel for moving the first movable panel inward and outward relative to the sealed chamber, and
(C) the movement of the first movable panel by the electroacoustic driver is operable for generating sound by the electroacoustic loudspeaker; and
(iii) a position sensor to track the position of the ferromagnetic disc, the first movable panel, or both;
(b) utilizing the bidirectional force electromagnet transducer to move a first movable panel of the electroacoustic loudspeaker to generate sound, wherein
(i) the first electromagnet pulls the ferromagnetic disc in a first direction,
(ii) the second electromagnetic pulls in a second direction, and
(iii) the first direction and the second direction are oppositely directed; and
(c) utilizing a position sensor to track the position of the ferromagnetic disc, the first movable panel, or both.

* * * * *